Sept 17, 1957 S. R. RICH 2,806,946
PULSE COINCIDENCE CIRCUIT
Filed June 2, 1952

INVENTOR
STANLEY R. RICH
BY Elmer J. Gorn
ATTORNEY

United States Patent Office 2,806,946
Patented Sept. 17, 1957

2,806,946
PULSE COINCIDENCE CIRCUIT

Stanley R. Rich, West Hartford, Conn., assignor to Raytheon Manufacturing Company, Newton, Mass., a corporation of Delaware Application June 2, 1952, Serial No. 291,360

6 Claims. (Cl. 250—27)

This invention relates to a means for simply and accurately determining the coincidence of two overlapping pulses.

The device, according to the invention, is essentially a "micro-vernier" coincidence discriminator which provides an output signal whenever two pulses to be compared for coincidence are close enough together in time that the trailing edge of one pulse at least begins to overlap the leading edge of the other pulse. This device may be used, for example, in conjunction with a conventional "coarse" discriminator, which serves to provide a control signal when the two pulses are some distance apart. The discriminator, according to the invention, may then take over when the pulses begin to overlap one another. In this region of overlapping, the "micro-vernier" system of the invention provides extremely accurate and sensitive performance sufficient to define discrimination within as little as .01 microsecond, at least over a portion of the operating range. An accuracy of coincidence measurements of better than .05 microsecond has been obtained in this manner for pulses of one microsecond in width.

The pulses whose coincidence is to be determined are assumed to have substantially the same amplitude and width. The condition of equal amplitude can be achieved by conventional limiter circuits, as is well known in the art. If the pulses are of the same sign or polarity, one of the pulses must be inverted. The two pulses of opposite sign are added algebraically in an electronic adder circuit, and the combined output signal is then differentiated to provide a wave form having three peaks. The central peak is opposite in polarity from the starting and terminating peaks and is of different amplitude than the other peaks except during exact coincidence of the initial pulses being compared. If the first pulse to arrive at the adder circuit is positive-going, the central peak of the wave form will be of opposite polarity from the central peak resulting from prior arrival of a negative pulse at the adder circuit, at least, for the same degree of overlapping of said pulses.

This wave form is applied to a balanced peak rectifier or detector comprising a pair of peak rectifiers which detect the positive and negative peak amplitude, separately, each in opposite sign, so that the sum, taken across the output of both rectifiers, is indicative of the difference between the positive and negative peak amplitude of the wave form produced at the output of the differentiator. The output from the peak rectifier has an amplitude, therefore, indicative of the amount of overlapping of the two pulses being compared, and a polarity dependent upon which of the two original pulses leads the other.

Figure 1:
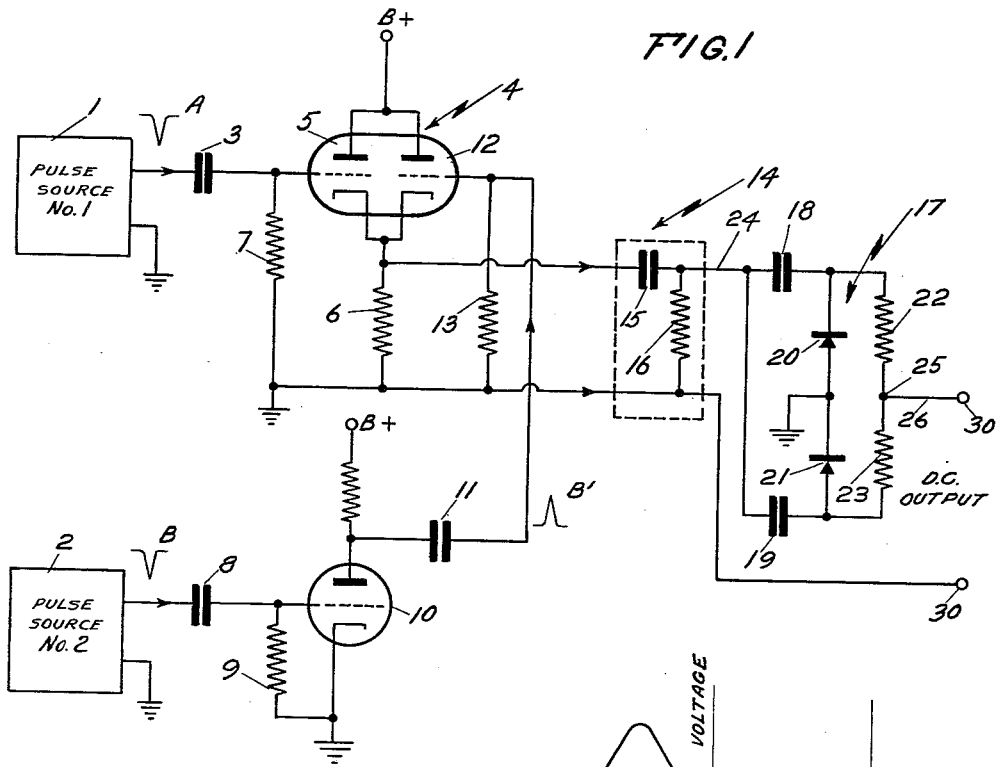
Fig. 1 is a circuit diagram of an embodiment of the subject invention.

In Fig. 1, the circuit comprises a first pulse source 1 and a second pulse source 2. Pulse A from source 1 is coupled through coupling condenser 3 to the grid of one section 5 of an adder tube 4 which is a dual triode vacuum tube having a first section 5 and a second section 12. The two anodes of adder tube 4 are connected to the positive terminal of a source of direct current voltage, while the two cathodes are connected to ground through a common cathode resistor 6. Grid bias resistors 7 and 13 form part of the circuitry of sections 5 and 12, respectively, of adder tube 4.

Pulse B, which is shown in Fig. 1 as being of the same polarity as pulse A from source 1, is applied by way of coupling condenser 8 to the grid of an inverter tube 10 which is biased by resistor 9. The output of inverter 10, indicated as pulse B', is applied via coupling condenser 11 to the grid of section 12 of adder tube 4. The inverter as shown in Fig. 1 is a conventional amplifier whose output and input voltages are 180 degrees out of phase. Any type of inverter may be used, however, in lieu of the one shown in Fig. 1.

If pulse B, derived from pulse source 2, were of opposite polarity from pulse A, the inverter 10 would, of course, be omitted and the output from pulse source 2 would be applied directly to section 12 of adder tube 4.

Adder 4 is a conventional cathode follower, the output of which is derived across cathode resistor 6, as shown in Fig. 1. The adder output wave form is either as shown in Fig. 2a, if pulse A precedes pulse B, or as shown in Fig. 3a when pulse B precedes pulse A.

The wave form from adder 4 is next differentiated in a conventional differentiating circuit 14 comprising capacitor 15 and resistor 16. The wave form derived by differentiation has three peaks, provided that the pulses are overlapping. The central peak is larger than the starting and terminating peaks, as shown in Figs. 2b and 3b, since the rate of change of voltage over the overlapping region of the two pulses is greater than that of the individual pulses. If pulse A arrives before pulse B, the result of differentiating the wave form of Fig. 2a is shown in Fig. 2b. Should pulse B precede pulse A, on the other hand, the output of differentiator 14 would be substantially as shown in Fig. 3b.

The wave form derived from differentiator 14 is applied to a conventional balanced peak rectifier 17. One of the output leads 24 from differentiator 14 is coupled to the rectifier circuit by similar condensers 18 and 19. The balanced rectifier comprises a pair of diodes 20 and 21 arranged with the cathode of one diode 20 and the anode of the other diode 21 connected to ground. The anode of diode 20 and the cathode of diode 21 are connected to coupling condensers 18 and 19, respectively. A pair of serially-connected resistors 22 and 23 are connected between the anode of diode 20 and the cathode of diode 21. An output lead 26 having one terminal 30 is connected to the common junction point 25 between resistors 22 and 23. The other terminal 30 of the output circuit is grounded.

When a positive-going wave form or pulse appears at the input to balanced rectifier 17, diode 20 conducts and, since the voltage drop across diode 20 is reduced to a very small value, the anode thereof is placed at approximately ground potential or the potential of the cathode. Since diode 21 is nonconducting, its cathode is positive with respect to ground by an amount substantially equal to the peak voltage of the pulse. Resistors 22 and 23 together comprise a voltage divider so that junction point 25 is at a potential above ground which bears the same relationship to the potential appearing at the cathode of diode 21 (approximately ground potential) as the ohmic value of resistor 23 bears to that of resistor 22.

For proper operation of peak rectifier 17, the resistance of resistors 22 and 23 should be made equal.

Similarly, if a negative-going wave form or pulse appears at the input to peak rectifier 17, the anode of diode 20 attains a potential substantially equal to the peak value of said wave form or pulse. Diode 21 becomes conductive and its cathode reaches substantially ground potential. Junction point 25 is now at a potential below ground which, if resistors 22 and 23 are of equal value, is substantially half of the potential appearing at the anode of diode 20.

Figure 2:
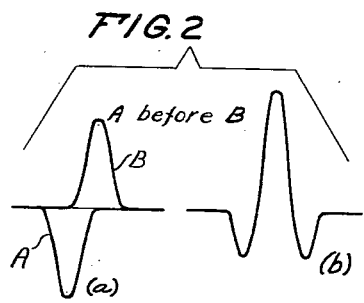
Figs. 2 and 3 are typical wave forms illustrating the principles of operation of the circuit of Fig. 1.
Figure 3:
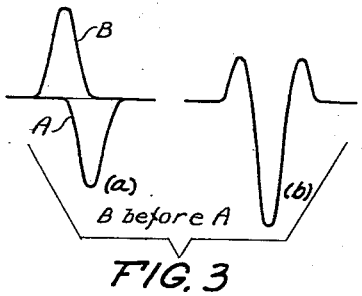

As shown in Fig. 2, when pulse A precedes pulse B, the postive peak value of the central peak of the wave form of Fig. 2b is considerably larger than the negative peak value of the starting and terminating peaks so that the resultant peak voltage is positive. If pulse A trails pulse B, as shown in Fig. 3, the negative peak value of the large central peak is greater than the surrounding positive peaks so that the resultant peak voltage is negative. Thus, balanced peak rectifier 17 develops a direct current potential at terminals 30, 30 which is either positive or negative, depending upon the polarity of the central peak of the wave form of Figs. 2b or 3b, as the case may be. The magnitude of the direct current output voltage derived at terminals 30, 30 is dependent upon the degree of overlap of pulses A and B.

Figure 4:
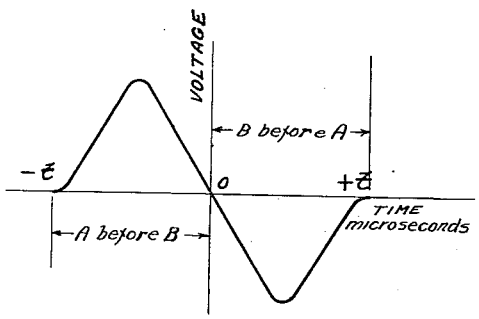
Fig. 4 is a typical discriminator characteristic for the circuit of Fig. 1.

Fig. 4 is a typical discriminator characteristic obtained with pulses whose durations are one microsecond. The extremeties $-t$ and $+t$ are then equal to one microsecond and correspond to the condition in which the trailing edge of one pulse and the leading edge of the other pulse just coincide; in other words, when the time difference between said pulses is equal to the pulse duration $t$, the direct current voltage output at terminals 30, 30 is zero. At exact coincidence, the output voltage is again zero. Between these points, the direct current output is substantially as shown in Fig. 4 in which the central or operative portion of the characteristic is substantially linear.

The device, according to this invention may be adapted for use as an indicator, a control circuit component, or many other uses. For example, an indicating device such as a zero-center direct current voltmeter may be positioned across terminals 30, 30 to indicate the coincidence between two pulses or the output across said terminals may be applied to follow-up or automatic frequency control circuits.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A circuit for indicating coincidence between first and second overlapping input pulses comprising means for electronically adding said first and second input pulses, means for differentiating said added pulses to obtain a wave form having unbalanced peaks, and circuit means including a balanced peak rectifier responsive to said wave form for deriving an output signal indicative of coincidence between said first and second input pulses.

2. A circuit for indicating coincidence between first and second overlapping input pulses of opposite polarity comprising means for combining said first and second input pulses to produce a first wave form dependent upon which of said puises is leading the other, means for differentiating said first wave form to produce a second wave form having unbalanced peaks, and circuit means responsive to said second wave form for deriving an output signal whose magnitude is indicative of the amount of overlapping of said pulses and whose polarity is representative of the relative time of occurrence of said pulses.

3. A circuit for indicating coincidence between overlapping first and second input pulses of opposite polarity comprising means for electronically adding said first and second input pulses to produce a first wave form dependent upon which of said pulses is leading the other, means for differentiating said first wave form to produce a second wave form having a centrally positioned peak of one polarity surrounded by smaller peaks of polarity opposite that of said centrally positioned peak, and circuit means including a balanced peak rectifier responsive to said second wave form for deriving an output signal indicative of the amount of overlapping of said pulses and the relative time of occurrence of said pulses.

4. A circuit for indicating coincidence between overlapping first and second input pulses of the same polarity comprising means for inverting the polarity of one of said pulses, means for electronically adding said first and second input pulses to produce a first wave form dependent upon which of said pulses is leading the other, means for differentiating said first wave form to produce a second wave form having a centrally positioned peak of one polarity surrounded by smaller peaks of polarity opposite that of said centrally positioned peak, and circuit means including a balanced peak rectifier responsive to said second wave form for deriving an output signal indicative of the amount of overlapping of said pulses and the relative time of occurrence of said pulses.

5. A device for indicating coincidence between first and second input pulses comprising means for electronically adding said first and second input pulses in opposite polarity to obtain a first wave form dependent upon which of said pulses is leading the other, means for differentiating said first wave form to obtain a second wave form having a central peak of one polarity positioned between outer peaks whose polarity is opposite to said one polarity, said outer peaks being of smaller amplitude than said central peak in the absence of coincidence, means including a pair of peak rectifiers each responsive to a portion of said second wave form of like polarity for deriving an output signal whose magnitude is indicative of the amount of overlapping of said first and second pulses and whose polarity is representative of the relative phase of said first and second pulses.

6. A device for indicating coincidence between first and second overlapping input pulses comprising first means electrically combining said first and second input pulses in opposite polarity to produce a first waveform dependent upon which of said pulses is leading the other in phase, means for differentiating said first waveform to produce a second waveform having a leading peak, a trailing peak, and a central peak intermediate said leading and trailing peaks, said central peak being of greater magnitude than and of opposite polarity to said leading and trailing peaks, and circiut means responsive to said second waveform for deriving an output signal whose magntiude is indicative of the amount of overlapping of said pulses and whose polarity is representative of the relative time of occurrence of said pulses.

References Cited in the file of this patent

UNITED STATES PATENTS

| | | |
|---|---|---|
| 2,061,734 | Kell | Nov. 24, 1936 |
| 2,118,626 | Smith | May 24, 1938 |
| 2,408,079 | Labin et al. | Sept. 24, 1946 |
| 2,448,718 | Koulicovitch | Sept. 7, 1948 |
| 2,475,074 | Bradley et al. | July 5, 1949 |
| 2,552,588 | Reeves | May 15, 1951 |
| 2,717,992 | Weintraub | Sept. 13, 1955 |